United States Patent
Zhou et al.

(10) Patent No.: US 11,535,070 B2
(45) Date of Patent: Dec. 27, 2022

(54) METHOD FOR OUTER CONTOUR STRUCTURE OF TIRE FOR REDUCING TIRE WIND RESISTANCE

(71) Applicant: JIANGSU UNIVERSITY, Zhenjiang (CN)

(72) Inventors: Haichao Zhou, Zhenjiang (CN); Huiyun Li, Zhenjiang (CN); Huihui Zhai, Zhenjiang (CN); Qi Xia, Zhenjiang (CN); Zhen Jiang, Zhenjiang (CN); Qingyun Chen, Zhenjiang (CN); Guolin Wang, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/623,627

(22) PCT Filed: Dec. 11, 2020

(86) PCT No.: PCT/CN2020/135519
§ 371 (c)(1),
(2) Date: Dec. 29, 2021

(87) PCT Pub. No.: WO2021/129408
PCT Pub. Date: Jul. 1, 2021

(65) Prior Publication Data
US 2022/0266640 A1    Aug. 25, 2022

(30) Foreign Application Priority Data
Dec. 25, 2019   (CN) .......................... 201911356014.6

(51) Int. Cl.
*B60C 99/00* (2006.01)
*G06F 30/28* (2020.01)
(Continued)

(52) U.S. Cl.
CPC ............ *B60C 99/006* (2013.01); *G06F 30/10* (2020.01); *G06F 30/28* (2020.01);
(Continued)

(58) Field of Classification Search
CPC ....... B60C 99/006; G06F 30/10; G06F 30/28; G06F 2111/08; G06F 2111/10;
(Continued)

(56) References Cited

U.S. PATENT DOCUMENTS

| 9,471,725 | B2 * | 10/2016 | Imamura | ............... B60C 99/006 |
| 2003/0055617 | A1 * | 3/2003 | Iwasaki | ................... B60C 19/00 703/2 |
| 2017/0197465 | A1 * | 7/2017 | Hatanaka | .................. B60C 3/04 |

FOREIGN PATENT DOCUMENTS

| CN | 104331536 A | 2/2015 |
| CN | 107145663 A | 9/2017 |

(Continued)

*Primary Examiner* — Steven W Crabb
(74) *Attorney, Agent, or Firm* — Bayramoglu Law Offices LLC (57) ABSTRACT

A design method for an outer contour structure of a tire capable of reducing tire wind resistance, including the following steps: step 1, establishing an initial tire model; step 2, building an tire aerodynamic drag calculation model; step 3, designing a testing scheme using tire five contour parameters; step 4, building a function relationship between tire five outer contour parameters and an aerodynamic drag coefficient values, and verifying the accuracy of the function relationship; and step 5, obtaining tire five outer contour parameters when the aerodynamic drag coefficient value is smallest by using an optimization algorithm. The design method effectively avoids the blindness problem in the design process of the tire outer contour structure and can effectively reduce the design cycle number of the tire outer contour structure, thereby improving the improvement effi-
(Continued)

ciency, meanwhile, it is benefit to reduce tire aerodynamic drag and improve vehicle economy and reduce harmful emissions.

10 Claims, 9 Drawing Sheets

(51) Int. Cl.
  *G06F 30/10*       (2020.01)
  *G06F 113/08*      (2020.01)
  *G06F 111/08*      (2020.01)
  *G06F 111/10*      (2020.01)
(52) U.S. Cl.
  CPC ....... *G06F 2111/08* (2020.01); *G06F 2111/10* (2020.01); *G06F 2113/08* (2020.01)
(58) Field of Classification Search
  CPC ...... G06F 2113/08; Y02T 10/82; Y02T 90/00; G06T 17/00
  See application file for complete search history.

(56) References Cited

FOREIGN PATENT DOCUMENTS

| CN | 107239595 A | 10/2017 |
| CN | 109800461 A | 5/2019 |
| CN | 111159874 A | 5/2020 |

\* cited by examiner

METHOD FOR OUTER CONTOUR STRUCTURE OF TIRE FOR REDUCING TIRE WIND RESISTANCE

CROSS REFERENCE TO THE RELATED APPLICATIONS

This application is the national phase entry of International Application No. PCT/CN2020/135519, filed on Dec. 11, 2020, which is based upon and claims priority to Chinese Patent Application No. 201911356014.6, filed on Dec. 25, 2019, the entire contents of which are incorporated herein by reference.

TECHNICAL FIELD

The invention relates to a design method for a tire outer contour structure, in particular to a design method of reducing aerodynamic drag for a tire outer contour structure, it is in tire technical field.

BACKGROUND

With the increasing global warming and energy shortage, the world attaches more and more importance to environmental protection. As a travel daily traffic tool, automobiles will surely, become an important part for energy saving and emission reduction. Lots of automobile companies urgently need to work hard to improve the energy efficiency of automobiles to solve the problem of environmental protection. When an automobile is driving at high speed, the fuel consumption rate caused by aerodynamic drag can account for up to 50%. In the research field of reduction of automobiles aerodynamic drag, the body shape, chassis accessories, and rearview mirrors have been investigated. However, further optimization of vehicle components involves increasing difficulties. For instance, the best aerodynamic shape will affect the beauty and design of a car. Tires and wheels contribute to approximately 25% of the aerodynamic drag of the whole car, it cannot be overlooked in the reduction of vehicle aerodynamic drag. Therefore, how to form an efficient low aerodynamic drag design method for reducing tire aerodynamic drag is a significant issue in the academic world and the industrial world.

When the airflow moves around the moving automobile, the air impacts the tire and wheel, and the airflow will undergo a significant change owing to the influence of the tire outer contour, and the airflow will separate and forms vortices, thereby it will increase tire aerodynamic drag. The tire outer contour structure directly affects the airflow movement, and this has a decisive influence on the aerodynamic drag of the tire. For the same type of tires, due to the different design of the outer contour structure, the difference of aerodynamic drag of an automobile mounted the different tires is about 0.009. Therefore, the design of the tire outer contour structure is an important part of a low aerodynamic drag automobile design and development. Obviously, it is particularly necessary to explore the design of the tire outer contour structure to reduce the tire aerodynamic drag.

In order to reduce tire aerodynamic drag, domestic and foreign scholars have mostly focused on finding the best-performing solution from a large number of testing schemes to improve tire outer contour structure, or only analyzing the influence of a single design parameter of tire outer contour structure. As a result, the parameters selection of tire contour structure in the improvement process can be limited to the testing scheme, and there is a lot of uncertainty and blindness, and it will also result in problems such as low improvement efficiency. Therefore, there is an urgent need for a design method for tire outer contour structure to effectively reduce tire aerodynamic drag.

SUMMARY

Objectives of the Invention

Aiming at the deficiencies of prior technology, this present invention provides a design method of tire outer contour structure for reducing tire wind resistance. The present invention can effectively avoid the blindness problem in the design process of the tire outer contour structure and can effectively reduce the design cycle number of the tire outer contour structure, thereby improve the improvement efficiency, meanwhile, it is benefit to reduce tire aerodynamic drag and improve vehicle economy and reduce harmful emissions.

Technical Solutions

A design method for outer contour structure of tire for reducing tire aerodynamic drag, comprising the following steps:

step 1: according to a selected tire model, outer contour parameters of the selected tire model are divided into five outer contour parameters: upper sidewall height, running surface width, shoulder transition radius, and two tread arc radiuses; according to initial values of the five outer contour parameters of the selected tire model, initial tire three-dimensional model is drawn;

step 2: building an aerodynamic drag calculation model for the initial tire three-dimensional model using the initial values of the five outer contour parameters, and performing a numerical simulation analysis to obtain an aerodynamic drag coefficient value of the initial tire three-dimensional model;

step 3: designing a testing scheme, and taking the five outer contour parameters of the selected tire as design variables, and setting value ranges of design variables. Taking an aerodynamic drag coefficient value of tire as a target response value; A statistical sampling test design method is selected to generate testing schemes using the design variables, and a tire aerodynamic drag simulation analysis of each testing scheme is conducted, and the tire aerodynamic drag coefficient values of all the testing schemes are obtained;

step 4: according to the testing schemes and the tire aerodynamic drag coefficient values in step 3, a functional relationship between design variables of five outer contour parameters and aerodynamic drag coefficient values of testing schemes is constructed, and its accuracy is verified;

step 5: an intelligent optimization method is selected to optimize the functional relationship in step 4, so as to obtain the optimized five outer contour parameters when the aerodynamic drag coefficient value is the smallest, and then determining the optimized tire outer contour structure using the optimized five outer contour parameters.

Further, the tire outer contour structure for reducing a tire aerodynamic drag, wherein in the step 1, the five outer contour parameters are mainly described for a half-tire model in the tire width direction.

Further, wherein in the step 2, the construction method for tire aerodynamic drag coefficient value is a computational fluid dynamics calculation method; building a three-dimensional virtual wind tunnel model including tire and road surface, and the three-dimensional virtual wind tunnel mode is imported into a meshing software to generate the fluid domain grid and boundary layer grid around the tire three-dimensional model, and then setting boundaries for the velocity inlet, pressure outlet and tire wall movement mode, and the simulation analysis of aerodynamic drag coefficient value is obtained by using a computational fluid dynamics analysis software.

Further, wherein in the step 3, the five outer contour parameters of the initial tire three-dimension model are used as a reference basis, and the values range of the five outer contour parameters is that the upper sidewall height is 0.47 to 0.63 of the section height, the running surface width is 0.73 to 0.9 of the section width of the half-tire model, the shoulder transition radius is 15 to 45 mm, and the two tread arc radius is determined according to the selected initial tire three-dimensional model.

Further, wherein the statistical sampling test design method is the Latin hypercube test design method; through statistical design and data analysis of the tire aerodynamic drag coefficients, the key parameters of the five outer contour parameters that have a significant influence on the aerodynamic drag coefficient values are screened out.

Further, wherein in the step 4, the functional relationship is to construct a regression function based on the five outer contour parameters and aerodynamic drag coefficient values, and the regression function is the Kriging approximate model.

Further, wherein the step 4, the method for verifying the accuracy of functional relationship is a determination coefficient $R^2$ to check the accuracy of the Kriging approximate models the closer to 1 the determination coefficient $R^2$ is, the higher the accuracy of the Kriging approximate model is.

Further, wherein the expression of the determination coefficient $R^2$ is:

$$R^2 = \frac{\sum_{i=1}^{n}(\hat{y}_i - \bar{y})^2}{(y_i - \bar{y})^2} \quad (1)$$

where n is the number of testing schemes designed using the five outer contour parameters; $\hat{y}_i$ is the predictive value of the i-th response obtained using the Kriging approximate model; $y_i$ is the simulation value of the i-th testing scheme obtained using the numerical simulation analysis; $\bar{y}$ is the average value of all the predictive values.

Further, wherein in the step 5, the intelligent optimization algorithm is a simulated annealing optimization method, and the simulated annealing optimization method is used to conduct nonlinear optimum analysis for the Kriging approximate model, and the optimized five outer contour parameters are proposed when the aerodynamic drag coefficient value is the smallest.

Further, the temperature update function of the simulated annealing optimization method is firstly designed as following:

$$t_k/t_0/\ln(1+k) \quad (2)$$

where $t_k$ is the temperature value at step k, and $t_0$ is the initial temperature value;

the state acceptance function in simulated annealing optimization method is designed as:

$$p_{ij} = \begin{cases} 1 & \Delta E \geq 0 \\ \dfrac{1}{\left(1+esp\dfrac{\Delta E}{t_k}\right)} & \Delta E < 0 \end{cases} \quad (3)$$

where $\Delta E'=E_i-E_j$, $E_i$ is the energy function of the current solution state, $E_j$ is the energy function of the solution state to be accepted; the energy function $\Delta E$ is the value of the objective function;

The solving process is to search in the neighborhood of the current solution state with a small step, and the new solution in the solution state to be accepted is obtained as the following equation (4):

$$X_j=X_i+l\Delta \quad (4)$$

where $X_i$ is the current solution, $X_j$ is the new solution, l is the number of search cycle, and $\Delta$ is the search step size;

the detail solving process of the simulated annealing optimization method are as follows:

step 1: Setting calculation parameters for the initial temperature, the lowest temperature, the search step size and the upper limit number of the search cycle. After then, randomly generate an initial solution $X_0$, and set it as the current solution $X_i=X_0$;

step 2: calculate the energy function $E(X_i)$ in the current solution state; and generate a new solution $X_j$ according to equation (4);

step 3: calculate the energy function $E(X_j)$ in the solution state to be accepted, and calculate the energy function $\Delta E$;

step 4: determine whether to accept the new solution $X_j$ according to $\Delta E$ using the equation (3); if $\Delta E<0$, the new solution $X_j$ is accepted, and update the current solution and set $X_i=X_j$, and go to step 6; otherwise, if $\Delta E<$go to step 5;

step 5: determine whether the upper limit number of the search cycle is reached, if it is satisfied, go to step 8; otherwise, update the number of search cycle, that is, l=l+1, and go to step 2, step 6: update temperature step k=k+1 and update temperature value according to equation (2);

step 7: determine whether the temperature value has reached the lowest temperature value, if not, go to step 2; otherwise, go to step 8;

step 8: end the calculation process.

Beneficial Effects

The present invention can effectively avoid the blindness problem in the design process of tire outer contour structure, so as to shorten the design period and improve the research and development efficiency, and at the same time, The present invention will play a certain guiding role for the improvement of the low wind drag of tire.

DETAILED DESCRIPTION OF THE EMBODIMENTS

The present invention will be further described below in conjunction with the drawings and specific embodiments.

Figure 1:
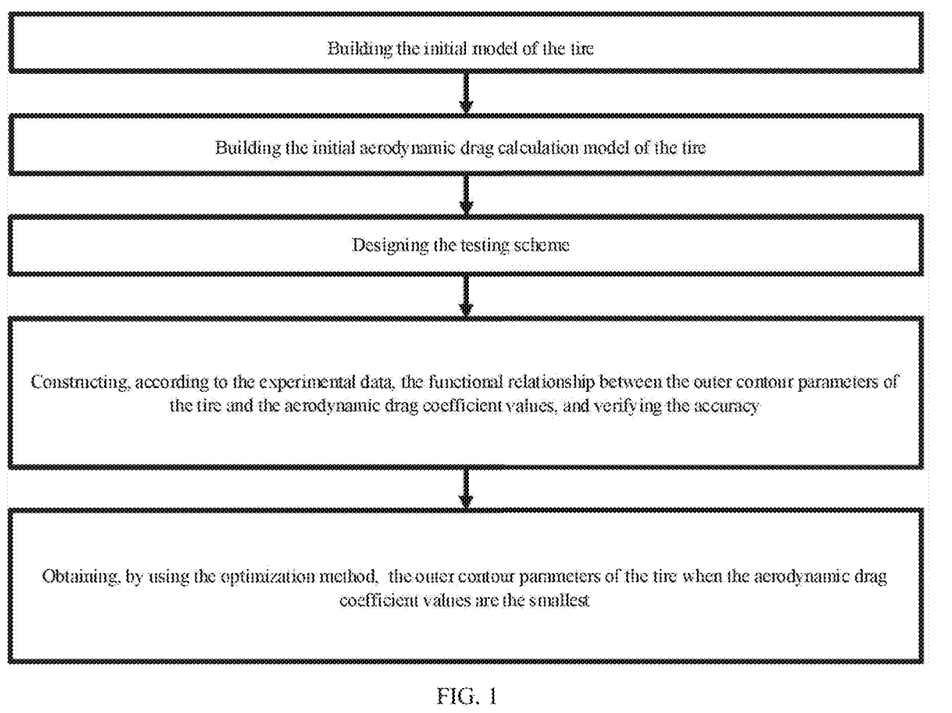
FIG. 1 is the flow chart in this present invention.

As shown in FIG. 1, a design method for outer contour structure of tire for reducing tire wind resistance, comprising the following steps:

step 1: An initial tire model was selected, and its three-dimensional model was drawn using the initial values of the five outer contour parameters.

Figure 2:
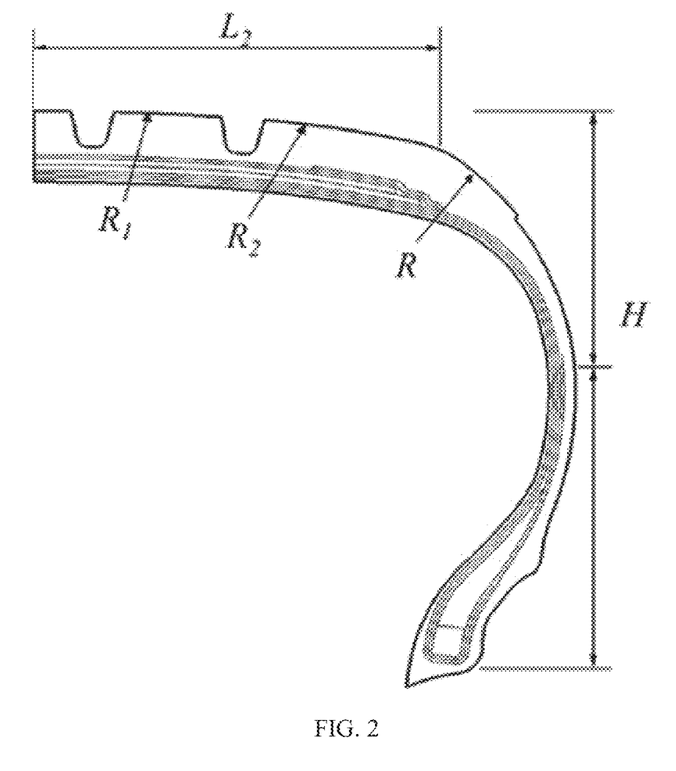
FIG. 2 is the schematic diagram of the five outer contour parameters m this present invention.

In example embodiment, a tire 185/65R15 was taken as an object, the section width is 185 mm, and half of the tread width is 97.5 mm, and the section height is 121 mm. According to the initial tire model, the five outer contour parameters are determined as the upper sidewall height $H1=57.06$ mm, the running surface width $L_2=67.61$ mm, the shoulder transition radius $R=35.87$ mm, the tread arc radius $R_1=817.391$ mm and $R_2=327.83$ mm, and the initial tire three-dimensional model as shown in FIG. 2 is established in CATIA software.

step 2: building an aerodynamic drag calculation model for the initial tire three-dimensional model using the initial values of the five outer contour parameters, and performing a numerical simulation analysis to obtain an aerodynamic drag coefficient value of the initial tire three-dimensional model.

Figure 3:
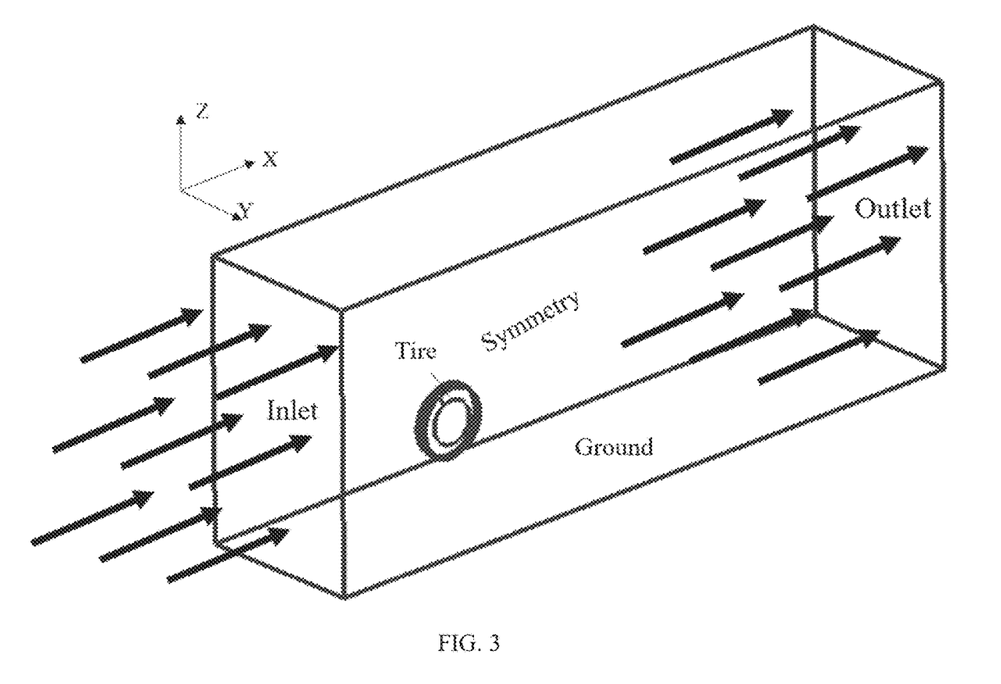
FIG. 3 is the three-dimensional virtual wind tunnel model in this present invention.

A three-dimensional virtual wind tunnel model including tire and road surface is built, as shown in FIG. 3. The fluid domain grid and boundary layer grid around the tire three-dimensional model are generated using HYPERMESH software, and the aerodynamic drag coefficient obtained using the computational fluid dynamics analysis software ANSYS Fluent In order to simulate the tire rolling on the road at a speed of 54 km/h, an inlet airflow velocity is set to 54 km/h (15 m/s) in the direction of the tire rolling.

The boundary conditions of the three-dimensional virtual wind tunnel model are set as follows: the inlet velocity is set as 15 m/s; the outlet is a 0 Pa pressure outlet condition; a symmetrical model is adopted, and the center plane is set as a symmetrical surface; the road is a non-sliding wall surface with a moving speed 15 m/s along the air flow direction the tire surface is a non-sliding wall surface with a rotational angular velocity 48.27 rad/s; all other surfaces are sliding wall surfaces with zero shear force.

After setting the boundary conditions, Firstly, a steady-state pressure base solver is used, the SST k-omega turbulence model is selected for flow steady calculations, a semi-implicit method for pressure linked equations-consistent (SIMPLEC) is used to resolve the coupling of pressure and velocity, and all discrete methods used the second-order upwind style to improve the calculation accuracy. The steady-state solution results are used in the unsteady calculation as initial conditions for transient analyses. The hybrid detached eddy simulations (DES) method is adopted to the unsteady calculation. In the unsteady calculation process, firstly, a time step 0.001 second is used to calculate 2000 steps, and its calculation time is 2 seconds, so that the instantaneous fluctuation of the flow field parameters is in a relative steady state. Then, the time step reduces to 0.0001 second and 10000 steps are continuously calculated, meanwhile, the aerodynamic drag coefficient of tire is monitored in the time domain; when the unsteady calculation is completed, the aerodynamic drag coefficient value is obtained by time-averaged method.

step 3: designing a testing scheme, and taking the five outer contour parameters of the selected tire as design variables, the value ranges of design variables are set, and the aerodynamic drag coefficient value of tire is taken as the target response value, a statistical sampling test design method is selected to generate testing schemes using the design variables, and a tire aerodynamic drag simulation analysis of each testing scheme is conducted, and the tire aerodynamic drag coefficient values of all the testing schemes are obtained.

The value ranges of design variables are set as follows: the section height of the initial tire is 1.21 mm, H is generally 0.47-0.63 of the section height, where $H \in [57.4, 76.5]$ mm, the tread arc radius $R_1 \in [400, 1200]$ mm and $R_2 \in [180, 350]$ mm, the running surface width $L_2$ is generally 0.73 to 0.9 of the half of the tire section width, where $L_2 \in [70, 90]$ mm, the shoulder transition radius is generally taken $R \in [15, 45]$ mm. The Latin hypercube test design method is selected to generate testing schemes using the design variables, 24 groups of testing schemes are proposed. Simulation analysis is conducted using the three-dimensional virtual wind tunnel model, the tire aerodynamic drag coefficient values of all the testing schemes are shown in Table 1.

TABLE 1

Testing schemes and analysis results

| Testing schemes of Latin hyper-cube | H/mm | $L_2$/mm | R/mm | $R_1$/mm | $R_2$/mm | drag coefficient value |
|---|---|---|---|---|---|---|
| 1 | 57.06 | 67.61 | 35.87 | 817.391 | 327.83 | 0.402169833 |
| 2 | 58.72 | 71.96 | 39.78 | 747.826 | 194.78 | 0.4009206 |
| 3 | 62.87 | 80.65 | 45.00 | 539.13 | 268.7 | 0.346375822 |
| 4 | 70.35 | 71.09 | 42.39 | 782.609 | 320.43 | 0.430176384 |
| 5 | 62.04 | 81.52 | 33.26 | 817.391 | 350 | 0.430319355 |
| 6 | 69.52 | 69.35 | 37.17 | 1130.435 | 202.17 | 0.425949078 |
| 7 | 59.55 | 75.43 | 17.61 | 1095.652 | 305.65 | 0.396346664 |
| 8 | 67.86 | 65.87 | 28.04 | 1165.217 | 313.04 | 0.416845208 |
| 9 | 65.37 | 70.22 | 21.52 | 643.478 | 342.61 | 0.406634621 |
| 10 | 64.53 | 72.83 | 15.00 | 469.565 | 224.35 | 0.38621991 |
| 11 | 67.03 | 82.39 | 29.35 | 573.913 | 187.39 | 0.346136461 |
| 12 | 73.67 | 78.91 | 24.13 | 1026.087 | 335.22 | 0.439895011 |
| 13 | 61.21 | 65.00 | 22.83 | 886.957 | 231.74 | 0.423275194 |
| 14 | 68.69 | 78.04 | 20.22 | 1060.87 | 216.96 | 0.344710285 |
| 15 | 55.4 | 77.17 | 26.74 | 504.348 | 283.48 | 0.39798132 |
| 16 | 57.89 | 85.00 | 30.65 | 956.522 | 239.13 | 0.42155861 |
| 17 | 69.413 | 83.344 | 20.37 | 564.76 | 271.87 | 0.344919001 |
| 18 | 71.18 | 83.26 | 38.48 | 991.304 | 253.91 | 0.400896293 |
| 19 | 60.38 | 74.57 | 41.09 | 1200 | 268.7 | 0.40046475 |

TABLE 1-continued

Testing schemes and analysis results

| Testing schemes of Latin hyper-cube | H/mm | L$_2$/mm | R/mm | R$_1$/mm | R$_2$/mm | drag coefficient value |
|---|---|---|---|---|---|---|
| 20 | 56.23 | 75.43 | 18.91 | 921.739 | 180 | 0.346560972 |
| 21 | 63.7 | 66.74 | 34.57 | 400 | 261.3 | 0.405419515 |
| 22 | 74.5 | 68.48 | 25.43 | 713.043 | 246.52 | 0.421364689 |
| 23 | 65.37 | 84.13 | 16.3 | 678.261 | 290.87 | 0.341457935 |
| 24 | 72.84 | 73.7 | 43.7 | 608.696 | 209.57 | 0.408411731 | step 4: The functional relationship between the tire five outer contour parameters and aerodynamic drag coefficient values of testing schemes is constructed according to the analysis results in Step 3, and its accuracy is verified using determination coefficient $R^2$.

Kriging approximate model is used to construct the functional relationship between the tire five outer contour structure parameters and aerodynamic drag coefficient values under 24 testing schemes. Before the Kriging approximate model is used to analyze and calculate the relationship between the design variables and the target response values, the determination coefficient $R^2$ was used to verify the accuracy of the Kriging approximate model. The expression of $R^2$ was:

$$R^2 = \frac{\sum_{i=1}^{n}(\hat{y}_i - \bar{y})^2}{(y_i - \bar{y})^2} \quad (1)$$

where n is the number of testing schemes, n=24; $\hat{y}_i$ is the predictive value of the i-th response obtained using the Kriging approximate model; $y_i$ is the simulation value of the i-th testing scheme obtained using the numerical simulation analysis; $\bar{y}$ is the average value of all the predictive values.

Figure 4:
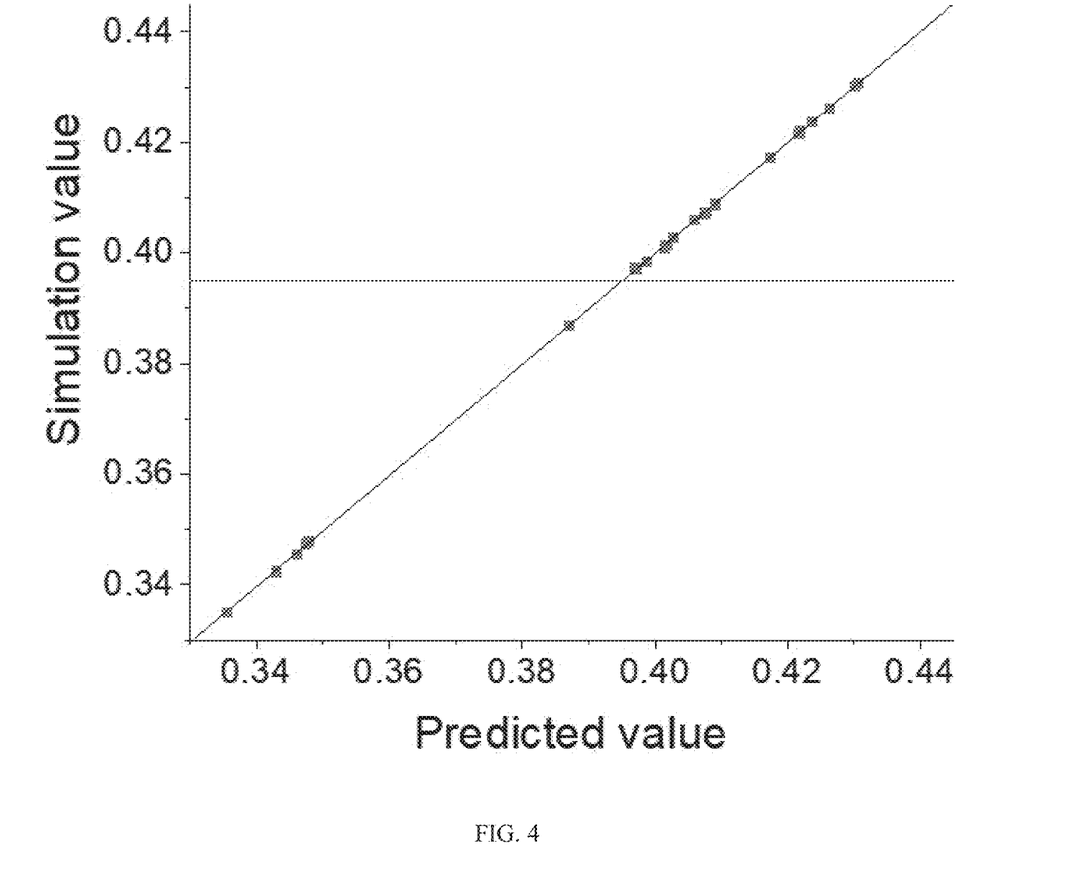
FIG. 4 is the accuracy verification of the Kriging approximate model in the present invention.
Figure 5:
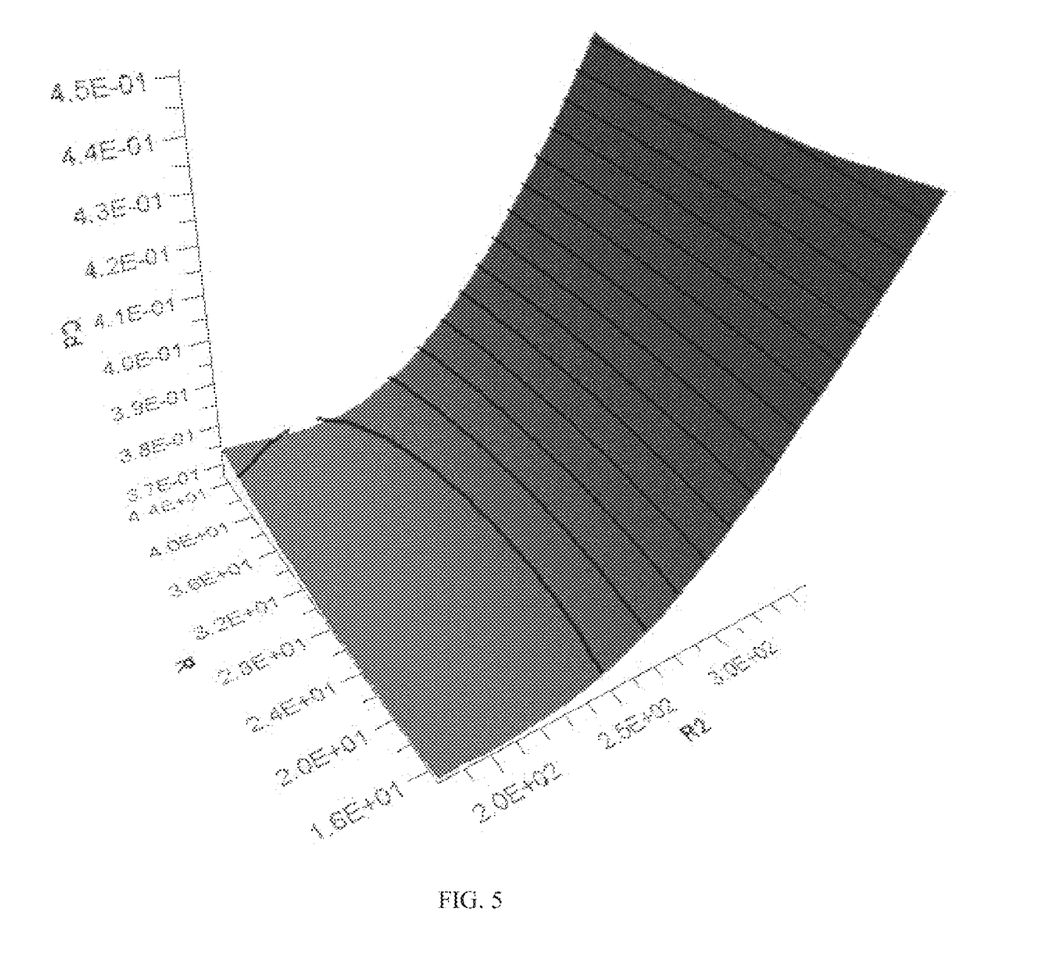
FIG. 5 is the relationship between aerodynamic drag coefficient $C_d$ and shoulder transition radius R and tread radius $R_2$ obtained using Kriging approximate model in this present invention.
Figure 6:
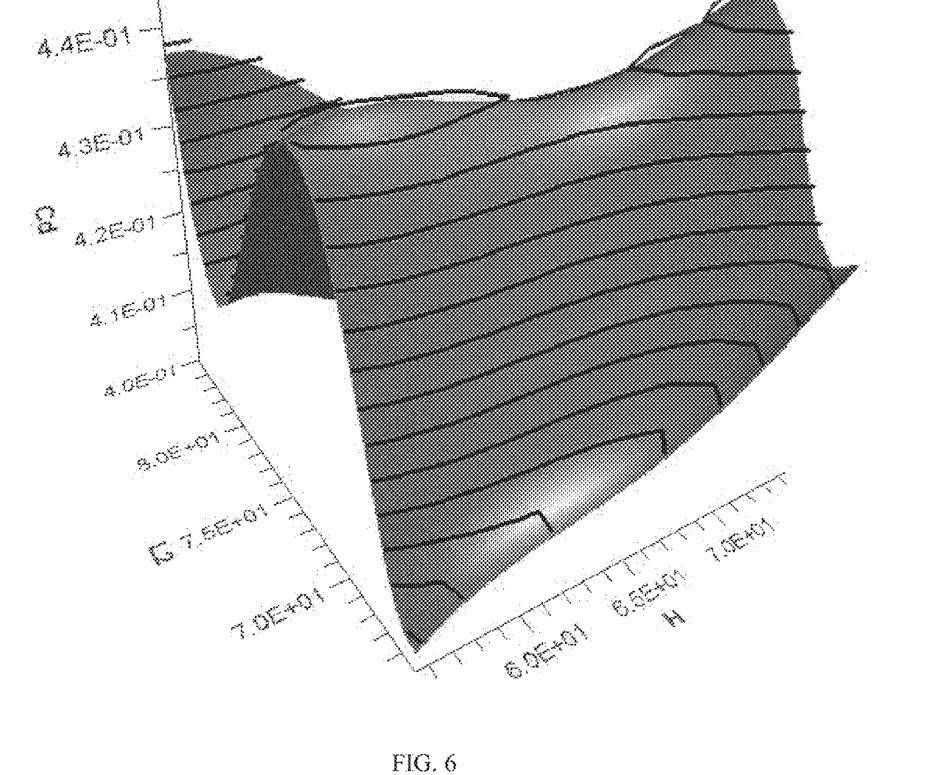
FIG. 6 is the relationship between aerodynamic drag coefficient $C_d$ and the running surface width $L_2$ and the upper sidewall height H obtained using Kriging approximate model in this present invention.
Figure 7:
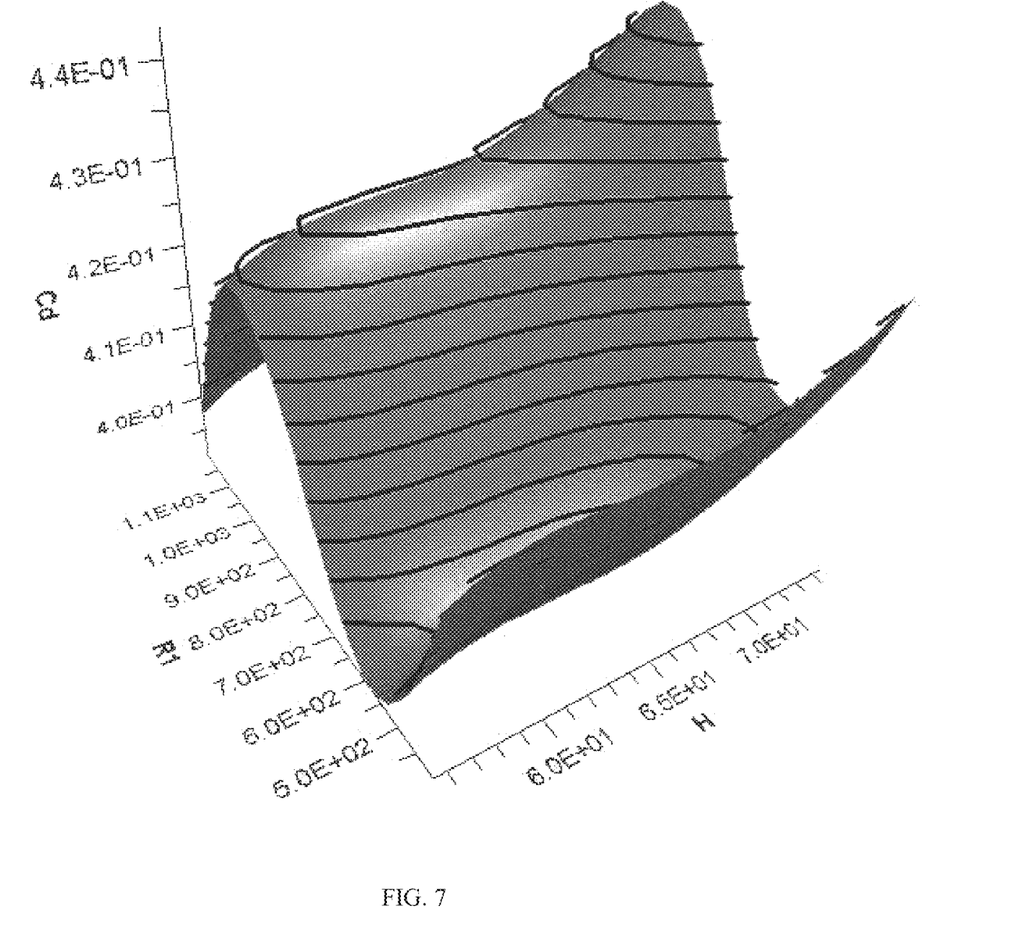
FIG. 7 is the relationship between aerodynamic drag coefficient $C_d$ and the tread radius $R_1$ and the upper sidewall height H obtained using Kriging approximate model in this present invention.
Figure 8:
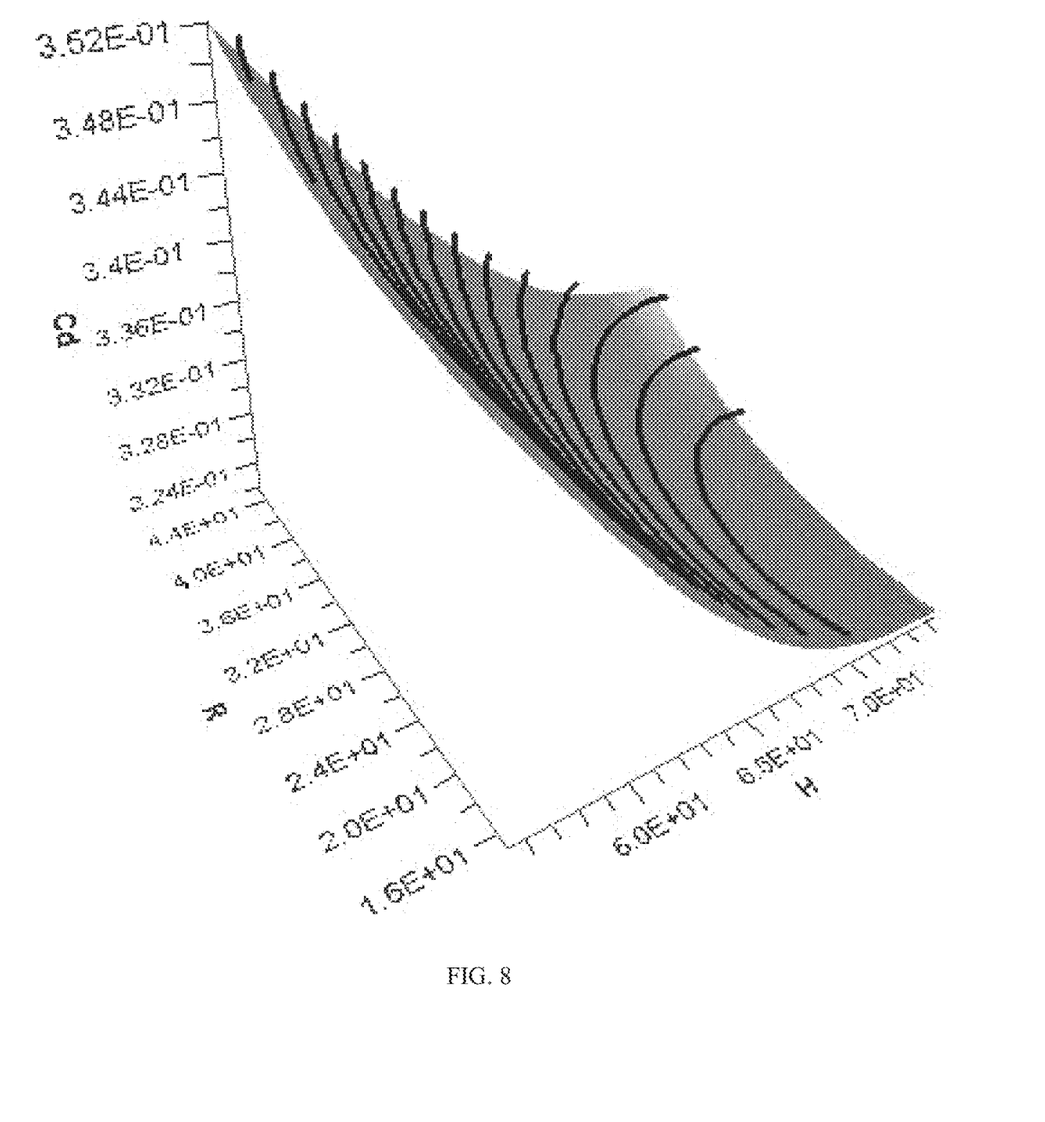
FIG. 8 is the relationship between aerodynamic drag coefficient $C_d$ and shoulder transition radius R and upper sidewall height H obtained using Kriging approximate model in this present invention.

The closer to 1 the determination coefficient $R^2$ is, the higher the accuracy of the Kriging approximate model is. The determination coefficient $R^2$ is 0.983. At the same time, the comparison between the predictive value using the Kriging approximate model and the simulation value using ANSYS Fluent is shown in FIG. 4. The comparison result of FIG. 4 further verifies the accuracy of the Kriging approximate model.

FIGS. 5-8 show the relationship between aerodynamic drag coefficient $C_d$ and two outer contour parameters obtained using Kriging approximate model. It can be seen from these figures that H and $L_2$ has the greatest impact on $C_d$, and the change trend of $C_d$ is complex, and a degree of nonlinearity between the response values and the variables is obvious, this means that the interaction of tire outer contour parameters is large. The tread arc radius $R_1$ and $R_2$ are positively correlated with $C_d$, and $C_d$ increases with the increments of $R_1$ and $R_2$, and transition radius R has little influence on $C_d$.

step 5: Simulated annealing optimization method is used to conduct nonlinear optimum analysis for the Kriging approximate model, and the optimized five outer contour parameters are proposed when the aerodynamic drag coefficient value is the smallest.

The optimization design problem of tire outer contour structure parameters is described by a mathematical optimization model, which is transformed into a problem of finding the smallest aerodynamic drag coefficient value. The simulated annealing optimization algorithm is used to perform nonlinear optimization for the Kriging approximate model to get the smallest aerodynamic drag coefficient value. The simulated annealing optimization algorithm firstly design the temperature update function as shown in equation (2):

$$t_k = t_0/\ln(1+k) \quad (2)$$

where $t_k$ is the temperature value at step k, and $t_0$ is the initial temperature value;

the state acceptance function in simulated annealing optimization method is designed as equation (3):

$$p_{ij} = \begin{cases} 1 & \Delta E \geq 0 \\ \dfrac{1}{\left(1 + esp\dfrac{\Delta E}{t_k}\right)} & \Delta E < 0 \end{cases} \quad (3)$$

where $\Delta E = E_i - E_j$, $E_i$ is the energy function of the current solution state, $E_j$ is the energy function of the solution state to be accepted; the energy function $\Delta E$ is the value of the objective function;

The solving process is to search in the neighborhood of the current solution state with a small step, and the new solution in the solution state to be accepted is obtained as the following equation (4):

$$X_j = X_i + l\Delta \quad (4)$$

where $X_i$ is the current solution, $X_j$ is the new solution, l is the number of search cycle, and is the search step size;

the detail solving process of the simulated annealing optimization method are as follows:

step 1: Setting calculation parameters for the initial temperature, the lowest temperature, the search step size and the upper limit number of the search cycle, After then, randomly generate an initial solution $X_0$, and set it as the current solution $X_i = X_0$;

step 2: calculate the energy function $E(X_i)$ in the current solution state; and generate a new solution $X_j$ according to equation (4);

step 3: calculate the energy function $E(X_j)$ in the solution state to be accepted, and calculate the energy function JE;

step 4: determine whether to accept the new solution $X_j$ according to $\Delta E$ using the equation (3); if $\Delta E<0$, the new solution $X_j$ is accepted, and update the current solution and set $X_i = X_j$, and go to step 6; otherwise, if $\Delta E<0$, go to step 5;

step 5: determine whether the upper limit number of the search cycle is reached, if it is satisfied, go to step 8; otherwise, update the number of search cycle, that is, l=l+1, and go to step 2;

step 6: update temperature step k=k+1, and update temperature value according to equation (2);

step 7: determine whether the temperature value has reached the lowest temperature value, if not, go to step 2; otherwise, go to step 8;

step 8: end the calculation process.

Figure 9:
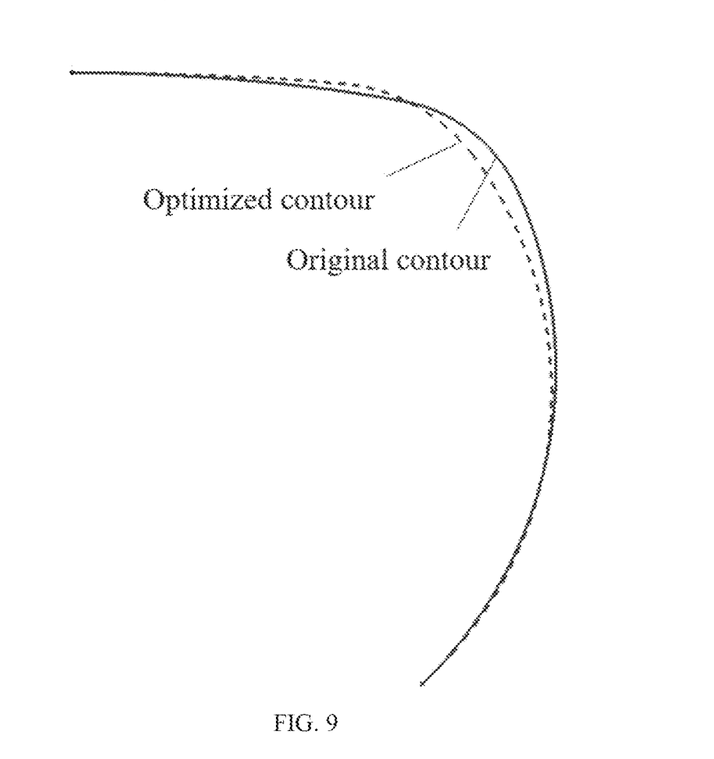
FIG. 9 is a comparison diagram of the layout of the tire outer contour structure before and after the optimization in the present invention.
Figure 10:
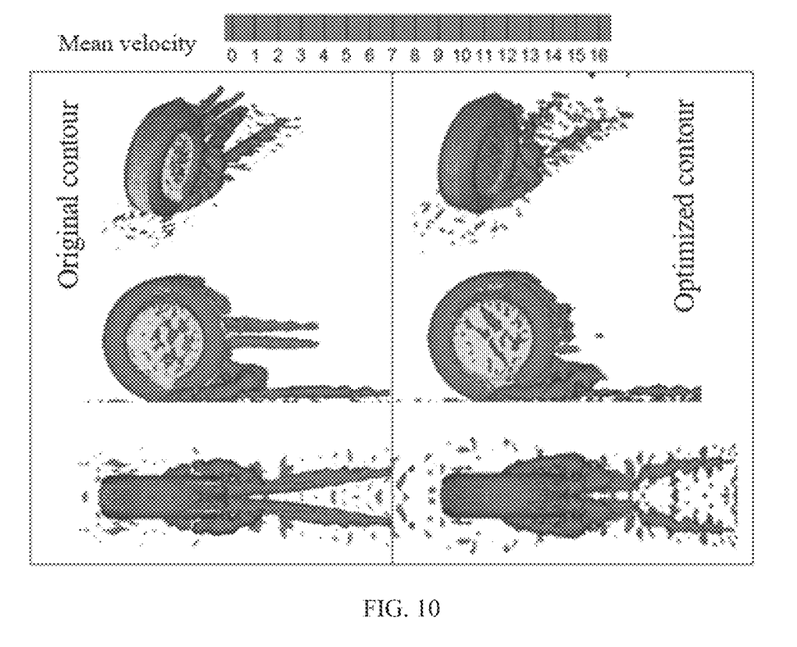
FIG. 10 is a comparison diagram of the vortices distribution around tire before and after the optimization in the present invention.

The initial temperature in the simulated annealing optimization method is set as 800°, and the lowest temperature is set as 0.05°. The search step size is $\Delta=0.01$, the number of search cycle is 1000, and the energy function is the aerodynamic drag coefficient value. The simulated annealing optimization method is conduct to optimize the tire five outer contour parameters to get the smallest aerodynamic drag coefficient value. After optimization are completed, the optimized five outer contour parameters are determined when the aerodynamic drag coefficient value is smallest, and then the optimized tire outer contour structure is established. The optimized five outer contour parameters are H=72.01 mm, $L_2$=79.78 mm, R=30.65 mm, $R_1$=434.78 mm, $R_2$=298.26 mm, and the optimized tire outer contour structure is shown in FIG. 9.

After the optimized tire outer contour structure established. Step 1 was used to simulate the aerodynamic drag coefficient value of the optimized tire is computed by using a three-dimensional virtual wind tunnel model presented in step 1. The comparison results before and after optimization are shown in Table 2. It can be seen from Table 2 that the aerodynamic drag coefficient value of optimized tire has decreased by 19.92%, thus reducing tire wind resistance and improving tire aerodynamic characteristics.

TABLE 2

Comparison of aerodynamic drag coefficients before and after optimization

| Tire outer contour structure design parameters | Original structure | Optimized structure |
| --- | --- | --- |
| Upper sidewall height H | 57.06 | 72.01 |
| Running surface width $L_2$ | 67.61 | 79.78 |
| Shoulder transition radius R | 35.87 | 30.65 |
| Tread arc radius $R_1$ | 817.391 | 434.783 |
| Tread arc radius $R_2$ | 327.83 | 298.26 |
| Aerodynamic drag coefficient value $C_d$ | 0.402169833 | 0.33389854 |

The example embodiments are the preferred embodiments in this present invention, but the present invention is not limited to the above-mentioned embodiments. Without departing from the essence of this present invention, any obvious improvements, substitutions or modifications that can be derived by those technicians in the field belong to the protection scope of the present invention.

What is claimed is:

1. A design method of a tire outer contour structure for reducing a tire aerodynamic drag, comprising the following steps:
   step 1: dividing, according to a selected tire model, outer contour parameters of a selected tire model into five outer contour parameters: an upper sidewall height, a running surface width, a shoulder transition radius, and two tread arc radiuses; drawing, according to initial values of the five outer contour parameters of the selected tire model, an initial tire three-dimensional model;
   step 2: building an aerodynamic drag calculation model for the initial tire three-dimensional model using the initial values of the five outer contour parameters of the selected tire model, and performing a numerical simulation analysis to obtain a tire aerodynamic drag coefficient value of the initial tire three-dimensional model;
   step 3: designing testing schemes, and taking the five outer contour parameters of the selected tire model as design variables, and setting value ranges of the design variables; taking the tire aerodynamic drag coefficient value of the initial tire three-dimensional model as a target response value; selecting a statistical sampling test design method to generate the testing schemes using the design variables, and conducting a tire aerodynamic drag simulation analysis of each of the testing schemes, and obtaining tire aerodynamic drag coefficient values of all the testing schemes;
   step 4: constructing, according to the testing schemes and the tire aerodynamic drag coefficient values in step 3, a functional relationship between the design variables of the five outer contour parameters of the selected tire model and the tire aerodynamic drag coefficient values of the testing schemes, and verifying an accuracy of the functional relationship;
   step 5: selecting an intelligent optimization method to optimize the functional relationship in step 4, so as to obtain optimized five outer contour parameters when the tire aerodynamic drag coefficient values are the smallest, and then determining an optimized tire outer contour structure using the optimized five outer contour parameters.

2. The design method of the tire outer contour structure for reducing the tire aerodynamic drag according to claim 1, wherein in the step 1, the five outer contour parameters of the selected tire model are mainly described for a half-tire model in a tire width direction.

3. The design method of the tire outer contour structure for reducing the tire aerodynamic drag according to claim 1, wherein in the step 2, a construction method for the tire aerodynamic drag coefficient value of the initial tire three-dimensional model is a computational fluid dynamics calculation method; building a three-dimensional virtual wind tunnel model including a tire and a road surface, and the three-dimensional virtual wind tunnel model is imported into a meshing software to generate a fluid domain grid and a boundary layer grid around the initial tire three-dimensional model, and then setting boundaries for a velocity inlet, a pressure outlet, and a tire wall movement mode, and the numerical simulation analysis of the tire aerodynamic drag coefficient value is obtained by using a computational fluid dynamics analysis software.

4. The design method of the tire outer contour structure for reducing the tire aerodynamic drag according to claim 1, wherein in the step 3, five outer contour parameters of the initial tire three-dimensional model are used as a reference basis, and value ranges of the five outer contour parameters of the initial tire three-dimensional model are that an upper sidewall height is 0.47 to 0.63 of a section height, a running surface width is 0.73 to 0.9 of a section width of a half tire model, a shoulder transition radius is 15 to 45 mm, and two tread arc radiuses are determined according to the initial tire three-dimensional model.

5. The design method of the tire outer contour structure for reducing the tire aerodynamic drag according to claim 1, wherein the statistical sampling test design method is a Latin hypercube test design method; through a statistical design and a data analysis of tire aerodynamic drag coefficients, key parameters of the five outer contour parameters having a significant influence on the tire aerodynamic drag coefficient values are screened out.

6. The design method of the tire outer contour structure for reducing the tire aerodynamic drag according to claim 1, wherein in the step 4, the functional relationship is to construct a regression function based on the five outer contour parameters of the selected tire model and the tire aerodynamic drag coefficient values of the testing schemes, and the regression function is a Kriging approximate model.

7. The design method of the tire outer contour structure for reducing the tire aerodynamic drag according to claim 6, wherein in the step 4, a method for verifying the accuracy of the functional relationship is a determination coefficient $R^2$ to check an accuracy of the Kriging approximate model; the closer to 1 the determination coefficient $R^2$ is, the higher the accuracy of the Kriging approximate model is.

8. The design method of the tire outer contour structure for reducing the tire aerodynamic drag according to claim 7, wherein an expression of the determination coefficient $R^2$ is:

$$R^2 = \frac{\sum_{i=1}^{n}(\hat{y}_i - \bar{y})^2}{(y_i - \bar{y})^2} \tag{1}$$

where n is a number of the testing schemes designed using the five outer contour parameters; $\hat{y}_i$ is a predictive value of an i-th response obtained using the Kriging approximate model; $y_i$ is a simulation value of an i-th testing scheme of the testing schemes obtained using the numerical simulation analysis; $\bar{y}$ is an average value of all predictive values.

9. The design method of the tire outer contour structure for reducing the tire aerodynamic drag according to claim 1, wherein in the step 5, the intelligent optimization method is a simulated annealing optimization method, and the simulated annealing optimization method is used to conduct a nonlinear optimum analysis for a Kriging approximate model, and the optimized five outer contour parameters are proposed when the tire aerodynamic drag coefficient values are the smallest.

10. The design method of the tire outer contour structure for reducing the tire aerodynamic drag according to claim 9, a temperature update function of the simulated annealing optimization method is firstly designed as following:

$$t_k = t_0 / \ln(1-k) \tag{2}$$

where $t_k$ is a temperature value at a step k, and $t_0$ is an initial temperature value;

a state acceptance function in the simulated annealing optimization method is designed as:

$$p_{ij} = \begin{cases} 1 & \Delta E \geq 0 \\ \frac{1}{\left(1 + esp\frac{\Delta E}{t_k}\right)} & \Delta E < 0 \end{cases} \tag{3}$$

where $\Delta E = E_i - E_j$, $E_i$ is an energy function of a current solution state, $E_j$ is an energy function of a solution state to be accepted; the energy function $\Delta E$ is a value of an objective function;

a solving process is to search in a neighborhood of the current solution state with a small step, and a new solution in the solution state to be accepted is obtained as the following equation (4):

$$X_j = X_i + l\Delta \tag{4}$$

where $X_i$ is a current solution, $X_j$ is the new solution, l is a number of a search cycle, and $\Delta$ is a search step size;

a detail of the solving process of the simulated annealing optimization method are as follows:

step 1: setting calculation parameters for the initial temperature value, a lowest temperature, the search step size, and an upper limit number of the search cycle; after then, randomly generating an initial solution $X_0$, and setting the initial solution $X_0$ as the current solution $X_i = X_0$;

step 2: calculating the energy function $E(X_i)$ in the current solution state; and generating the new solution $X_j$ according to the equation (4);

step 3: calculating the energy function $E(X_j)$ in the solution state to be accepted, and calculating the energy function $\Delta E$;

step 4: determining whether to accept the new solution $X_j$ according to $\Delta E$ using the equation (3); if $\Delta E < 0$, the new solution $X_j$ is accepted, and updating the current solution and setting $X_i = X_j$, and going to step 6; otherwise, if $\Delta E < 0$, going to step 5;

step 5: determining whether the upper limit number of the search cycle is reached, if the upper limit number of the search cycle is satisfied, going to step 8; otherwise, updating the number of the search cycle, that is, l=l+1, and going to step 2;

step 6: updating a temperature step k=k+1, and updating the temperature value according to the equation (2);

step 7: determining whether the temperature value reaches a lowest temperature value, if not, going to step 2; otherwise, going to step 8;

step 8: ending the solving process.

\* \* \* \* \*

UNITED STATES PATENT AND TRADEMARK OFFICE
CERTIFICATE OF CORRECTION

| | | |
|---|---|---|
| PATENT NO. | : 11,535,070 B2 | Page 1 of 1 |
| APPLICATION NO. | : 17/623627 | |
| DATED | : December 27, 2022 | |
| INVENTOR(S) | : Huihui Zhai et al. | |

It is certified that error appears in the above-identified patent and that said Letters Patent is hereby corrected as shown below:

On the Title Page

Item (12) "Zhou et al." should read -- Zhai et al. --.

Item (72) should read:
-- Huihui ZHAI, Zhenjaing (CN);
Haichao ZHOU, Zhenjiang (CN);
Huiyun Li, Zhenjaing (CN);
Qi Xia, Zhenjiang (CN);
Zhen Jaing, Zhenjiang (CN);
Qingyun CHEN, Zhenjiang (CN);
Guolin Wang, Zhenjiang (CN) --.

Signed and Sealed this
Thirteenth Day of June, 2023

Katherine Kelly Vidal
*Director of the United States Patent and Trademark Office*